G. SIPP & W. S. WELLS.
QUILLING MACHINE.
APPLICATION FILED MAR. 23, 1910.

1,056,462.

Patented Mar. 18, 1913.

G. SIPP & W. S. WELLS.
QUILLING MACHINE.
APPLICATION FILED MAR. 23, 1910.

1,056,462.

Patented Mar. 18, 1913.
8 SHEETS—SHEET 4.

G. SIPP & W. S. WELLS.
QUILLING MACHINE.
APPLICATION FILED MAR. 23, 1910.

1,056,462.

Patented Mar. 18, 1913.
8 SHEETS—SHEET 5.

WITNESSES:

INVENTORS,
Grant Sipp
and William S. Wells,
BY
ATTORNEY.

G. SIPP & W. S. WELLS.
QUILLING MACHINE.
APPLICATION FILED MAR. 23, 1910.

1,056,462.

Patented Mar. 18, 1913.
8 SHEETS—SHEET 8.

UNITED STATES PATENT OFFICE.

GRANT SIPP, OF PATERSON, NEW JERSEY, AND WILLIAM S. WELLS, OF FOUNTAIN HILL BOROUGH, PENNSYLVANIA, ASSIGNORS TO THE SIPP MACHINE COMPANY, OF PATERSON, NEW JERSEY, A CORPORATION OF NEW JERSEY.

QUILLING-MACHINE.

1,056,462.      Specification of Letters Patent.      Patented Mar. 18, 1913.

Application filed March 23, 1910. Serial No. 551,100.

*To all whom it may concern:*

Be it known that we, GRANT SIPP and WILLIAM S. WELLS, citizens of the United States, and residents of Paterson, Passaic county, New Jersey, and borough of Fountain Hill, Lehigh county, and State of Pennsylvania, respectively, have invented certain new and useful Improvements in Quilling-Machines; and we do hereby declare the following to be a full, clear, and exact description of the invention, such as will enable others skilled in the art to which it appertains to make and use the same, reference being had to the accompanying drawings, which form a part of this specification.

Our present invention relates to winding machines and particularly to machines for winding cops, quills and the like.

In the U. S. Letters Patent No. 739,523, granted to W. S. Wells, a tension device is disclosed which practice has demonstrated permits the thread to be advanced at practically any speed, regular or irregular, which it is desired to impose and yet preserve the tension constant and the thread intact.

Our principal object in the present instance is to provide a winding machine, employing such a tension device, which will be capable of advancing the thread and effecting the winding thereof in quills, cops or the like at a much higher speed than has heretofore been possible, whereby to increase the output.

Other objects are to improve the product, make it possible to change the character of the wind at will, reduce the amount of power which is required to operate the machine capable of ready disassembling and tending to produce vibration, render the machine capable of readily disassembling and assembling should access to any of its working parts be necessary for any reason, and limit the elements requiring attention on the part of the operator to the minimum.

While we prefer to employ in the improved machine a tension device of substantially the character of that above described, it will be understood that our invention is not limited, in any aspect thereof, to an organism including any particular tension device.

The invention will be found fully illustrated in eight sheets of drawings accompanying this specification, wherein, Fig. 14 is a top plan view of the lower plate forming part of a structure in which rotate the spindles and certain parts of their driving mechanism and in which are guided and supported the means, directly associated with the spindles, for effecting the traverse of the threads and the building of the cops or quills; Fig. 17 is an underneath plan view of the upper plate forming a part of said structure; Fig. 23 is a horizontal sectional view of certain plates serving to close the upper part of the frame; Fig. 24 is a fragmentary front elevation of a carrier for one of the rotary transmission members, and Fig. 25 a plan view thereof; Figs. 26 and 27 are a side and plan view, respectively, of a member forming a part of a lever structure controlling the carrier; Fig. 31 shows one of the tension devices and its supporting means, in plan; and, Fig. 32 is a side elevation of the bracket carrying said tension device.

Describing, first, the frame of the machine: $a$ $a$ designate two uprights forming the ends of the frame and $b$ $b$ two tie-rods connecting them together; $c$ $c$ are upper arms and $d$ $d$ lower arms projecting laterally from these uprights, the latter supporting a board $e$ on which may be set the supply spools $f$, each of which is preferably partly inclosed by a trough-shaped casing $g$, open at the front, which acts to confine the ballooning of the thread.

Figures 14, 16, 23:
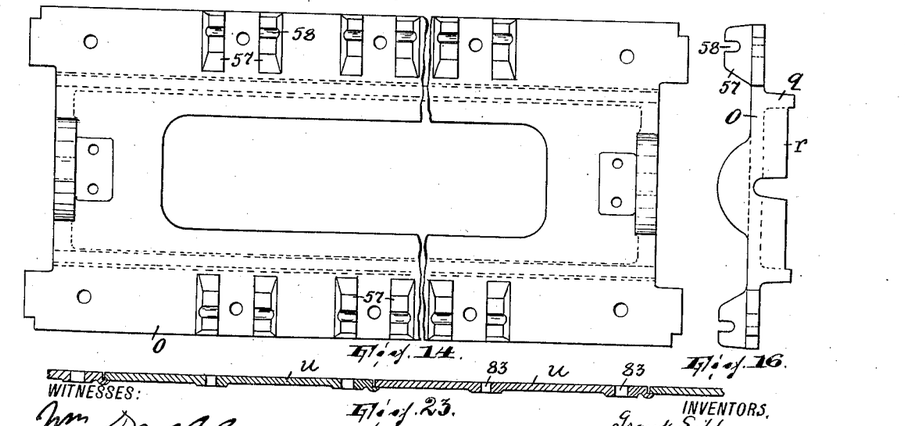
Figure 15:
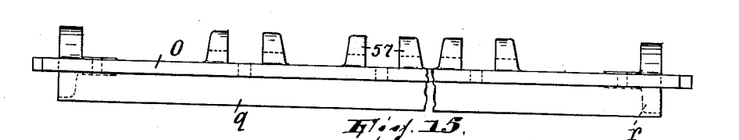
Fig. 15 is a side elevation of said plate and Fig. 16 an end elevation.
Figures 17, 19:
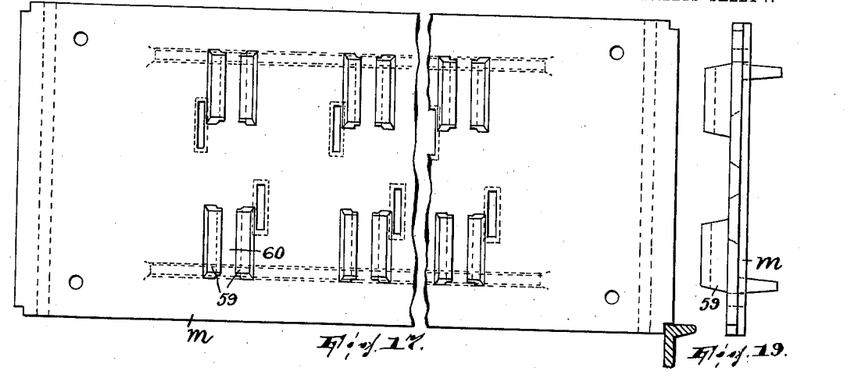
Figure 18:
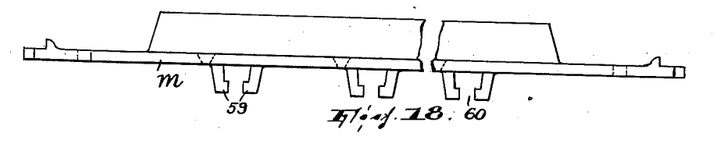
Fig. 18 is a side elevation and Fig. 19 an end elevation of said upper plate.

A supporting structure for the various winding units is arranged between the uprights in their upper portions and acts to brace the same and give stability to the frame as a whole. Said structure comprises the end-frames $h$ $h$, each of which is bolted to the inner face of an upright, the spindle-rails $i$ $i$, which are secured upon rests $j$ projecting from the end-frames, the idler-carrying rails $k$ $k$, likewise secured upon rests $l$ projecting from the end-frames, an upper plate $m$ secured upon rests $n$ projecting from the end-frames, and a lower plate $o$ imposed upon rests $p$ on the end-frames, said plate $o$ having downwardly projecting stiffening flanges $q$ which bear directly on said rests $p$ and which are connected at their ends by the webs $r$ notched to receive pins $s$ projecting from the end-frames and acting to prevent lateral displacement of the plate $o$. In addition, there are the channel-irons $t$ which connect and are secured at their ends to the uprights, each being arranged vertically above the corresponding spindle-rail, and the series of plates $u$ (Fig. 23) each overlapping one of its neighbors and individually secured to the corresponding channel-iron and spindle-rail by screws or the like $v$ (so that each may be separately removed upon having access to its screw $v$, having removed a top board $w$ which seats on the strips $x$, resting on the channel-irons), said series of plates serving to close the sides of the frame; upon detaching the spindle-rail and channel-iron at either side of the machine, the structure comprising these parts and the plates, together with certain portions of the winding units therewith associated, may be bodily removed from the machine to afford access to the working parts.

To the right-hand upright $a$ is bolted a bracket $y$ in which is journaled the main drive shaft $z$, the same being also journaled in the other upright $a$. The shaft is kept from endwise movement by a pinion 1 on its left-hand end in Fig. 1 and a collar 2 on its right-hand end, there being interposed between the collar and braket $y$ on the shaft, fast and loose pulleys 3 around either of which, according to the position of a belt-shifter 4, the driving belt (not shown), may extend. On shaft $z$ is splined a cone or conical face plate 5, and bearing against the inner side of the cone 5 is a collar or follower 6 loose on the shaft and having a flat projection 7 fitting a slot 8 in a horizontal lever 9 which is fulcrumed on a bracket 10 on one of the tie rods $b$ and rests at its handle end on a toothed bracket 11 carried by the other tie rod $b$. The bracket $y$ affords at 12 a step-bearing for a vertical shaft 13 whose upper end is journaled in a bracket 14 bolted to the adjoining end-frame $h$ (Fig. 2). On shaft 13 is splined a conical friction-wheel 15 which bears upon the cone 5. The action of gravity on the friction-wheel 15 normally tends to cause it to impel the cone to the left in Fig. 1; and, while the speed of the drive shaft is constant, the speed of shaft 13 may be varied according to the position in which lever 9 is held (engaged with the toothed bracket 11) and according to the positions, relatively to each other, which the cone 5 and friction wheel 15 assume. Broad claims for this mechanism, *per se*, have been reserved by us for a separate application. It may be remarked that the rotation of the several spindles is accomplished from shaft 13; the traverse or reciprocating motion of the thread guide is accomplished from shaft $z$.

Figure 10:
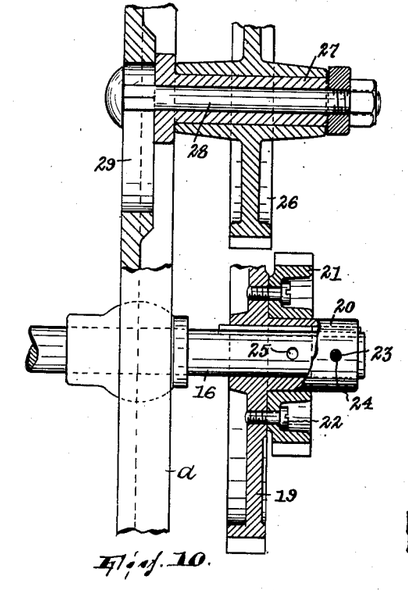
Fig. 10 is a sectional view showing certain gearing employed in effecting the traverse motion.

Parallel with shaft $z$ and directly below the same is journaled in the uprights $a$ $a$ shaft 16 carrying cams 17 and limited against endwise movement in its bearings by collars 18 engaging the uprights. On its outer end (Fig. 10) is splined a large spurwheel 19 carrying on its hub 20 a small spurwheel 21 which is secured to the large spurwheel by screws 22. The hub 20 is formed with a hole 23 to receive a cotter-pin 24 which may be introduced into either of two holes 25 in the shaft 16. An intermediate spurwheel 26 is journaled on a sleeve 27 secured to the adjoining upright by a bolt 28, the latter being adjustable in an arc-shaped slot 29 in the upright formed about shaft $z$ as a center. The spurwheel 26 is in permanent mesh with pinion 1 and it serves to transmit rotary motion to shaft 16 at two different speeds, according to whether it is spurwheel 19 or 21 which is in mesh with it.

Figure 11:
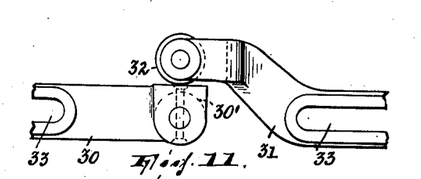
Fig. 11 is a fragmentary side elevation of certain levers employed in effecting the traverse motion.
Figure 12:
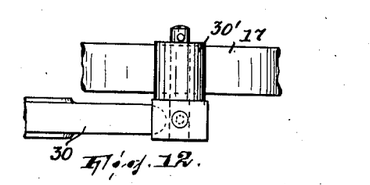
Fig. 12 is a fragmentary view showing, in plan, a portion of one of the cams employed in said traverse motion and one of the levers shown in Fig. 11.
Figure 13:
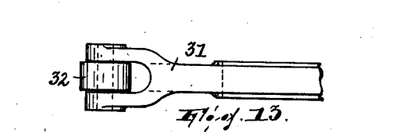
Fig. 13 is a fragmentary view showing, in plan, the other lever, shown in Fig. 11.

On the tie rods $b$ are fulcrumed two pairs of levers, each standing in the vertical plane of a cam 17. One lever 30 in each pair (Fig. 11) carries a roller 30' bearing directly on the cam 17; the other lever 31 carries a roller 32 bearing on lever 30 directly above the cam. Both levers in each pair have slots 33 and also upwardly projecting arms 34 which are connected by a spring 35 operating to press the levers toward the cam. A bearing block 36 is bolted to the under side of the plate *o* at each end thereof, each being formed with two half-portions 37 of bearings whose other half-portions 38 are held in place by a plate 39 secured to the bearing block 36 by a screw 40. In the bearings thus formed are journaled the parallel shafts 41, each carrying two pairs of outwardly projecting cranks 42 connected respectively with the levers 30 and 31 by pitmen 43. On the shafts 41 are also arranged outwardly projecting arms 43', each having an open bearing 44 at its outer end. The function of these arms will appear later.

Figure 20:
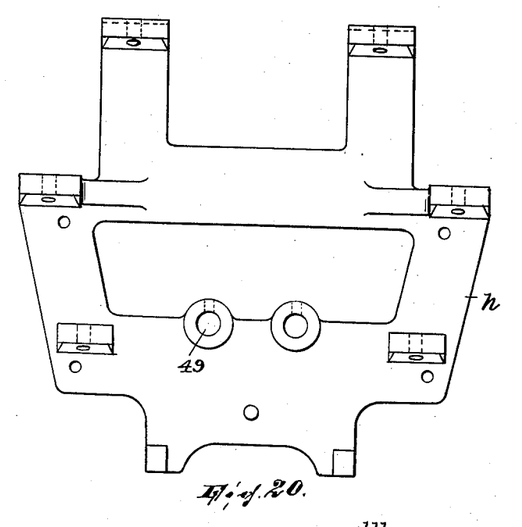
Fig. 20 is a front elevation of one of the end frames forming a part of said structure.
Figure 21:
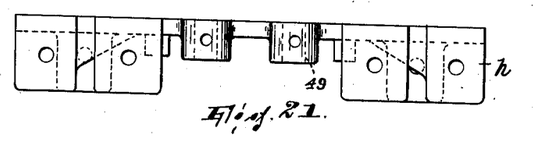
Fig. 21 is a top plan view and Fig. 22 a side elevation of said end frame.
Figure 22:
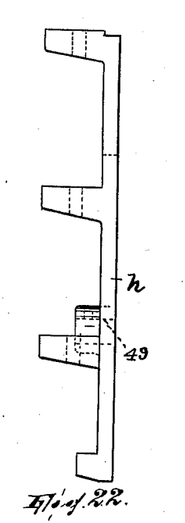

On shaft 13 is fixed a pulley 45 around which and a pulley 46 at the other end of the machine extends an endless belt 47. The pulley 46 is supported so as to be adjustable to and from pulley 45 to secure the necessary tension of the belt as follows: A pair of stub shafts 48 are fixed in the holes 49 which are formed in one of the end-frames *h* (Fig. 20) and on one of these is slipped the sleeve-portion 50 of a bracket 51 having a stub-shaft 52 forming the journal for pulley 46 and also having a tongue 53 which rests on the other shaft 48. A clamping plate 54 bears at one end against the bracket 51 and at the upper end against the shaft on which tongue 53 bears, a screw 55, penetrating the plate and tapped into the bracket, serving to effect the clamping action. On each rail *k* is journaled a series of idlers 56 flanged at their lower ends so as to support the belt.

Near each longitudinal side of the plate *o* and on the top surface thereof is formed a series of pairs of projections 57 having alined open bearings 58. In vertical coincidence with the projections 57 the plate *m* has a series of pairs of projections 59, the projections in each pair being spaced to form a transverse slot or guideway 60. In the bearing 58 of each pair of projections 57 are journaled the trunnions 61 of a tilting carrier 62, whose upper end has a fin 63 engaged in the corresponding slot or guideway 60. The spindles 64 are journaled in the bolsters 65 fixed in the spindle-rails *i*, and the whirl 66 of each spindle has a V-shaped peripheral groove. Rotary motion is imparted to each spindle from the belt through a rotary member journaled in the corresponding carrier 62. This member comprises a spindle 67 and a whirl 68 and a friction wheel 69 fixed on the spindle and respectively engageable with the belt and the whirl 66; the spindle 67 has a suitable bearing at its upper end in the carrier 62 and at its lower end it rests on a ball 70 arranged in the carrier. The periphery of the friction-wheel 69 is formed cross-sectionally V-shaped so as to fit the groove in the wheel 66 and spindle 67 has slight longitudinal movement in its bearings so that the friction-wheel may adjust itself to the whirl. In order to set and adjust the carrier from time to time to take up wear between the parts (preserving the whirl and friction wheel in proper alinement with each other and the spindle resting on its bearing 70) a set screw 71 is tapped into the plate *o* under the carrier in engagement therewith, the point of contact of the screw with the carrier being slightly inward with respect to the trunnion 61. It will be noted that the whirls 66 and 68 have relatively less diameter than the friction-wheel 69, whereby the peripheral speed of the spindle is many times faster than that of the whirl 68.

A horizontal shaft 72 extends through the frame, being supported by the upright *a*. 73 is one of a series of brackets (Figs. 26 and 27) which are fulcrumed on this shaft, each standing in the vertical plane of a carrier 62. At its lower end, each bracket has an arm 74 and its upper portion is T-shaped, one arm of the T having a vertical slot 75 and the other being connected with the arm 74 by a vertical rod 76 secured by pins to said arms and projecting upwardly. The slotted arm of the T receives a pin 77 sliding in a bore 78 formed in the corresponding carrier and cushioned on a spring 79 in said bore. The rod 76 has a series of holes 80 into any one of which a pivoting pin 81 for a hook 82 may be entered. The hook 82 has its hooked portion passed through a vertical slot 83 in one of the plates *u* and adapted to engage a stop 84 (formed in two parts clamped to the plate by a screw 85 penetrating the slot), the other end of the hook being a weight 86. The lever structure comprising the parts 73 and 76, when the hook is released from the stop, as hereinafter described, tends to fall away from the corresponding carrier on the shaft 72 as a fulcrum, such movement being limited by the rod 76 engaging the end of a slot 87 in plate *m* through which rod 76 projects; the tension of the belt 47, combined with the action of gravity, causes the carrier 62 to follow said lever structure, but the movement of the carrier at this time is but slight (being preferably sufficient only to break the contact between parts 66 and 69) because the spring 79 must first extend itself to its limit, or substantially so, before the carrier can follow the lever structure. The friction-wheels 69 project through openings 87' in the plates *u*.

Figure 28:
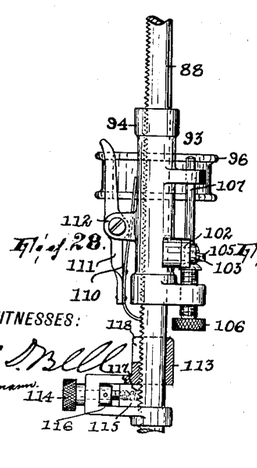
Fig. 28 is a side elevation, Fig. 29 a front elevation and Fig. 30 a plan of one of the cop building mechanisms.
Figure 29:
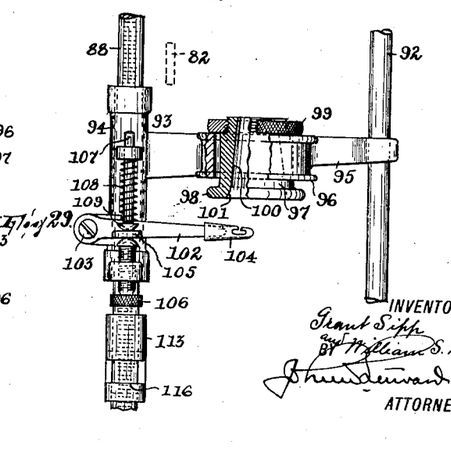

In each channel iron *t* and spindle rail *i* is arranged to slide a series of thread guide carrying rods 88, the same being notched longitudinally as seen in Figs. 28 and 29, and being carried by a rail 89 from which depend brackets 90 having anti-friction rollers 91 received by the open bearings of the arms 43'. Each thread guide rod is arranged at one side of a spindle, and at the other side thereof and parallel with the rod 88 is an auxiliary guide rod 92 fixed in the channel iron $t$ and spindle rail $i$. As already stated, the structure comprising the channel iron, spindle rail, plates $u$, spindles, and the rods 88 and 92 is removable bodily from the frame upon releasing the channel iron and spindle rail, the open bearings 44 in the arms 43 readily permitting such removal.

Figure 30:
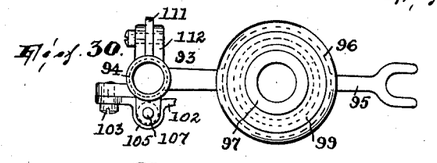

The cop building mechanism is shown in Figs. 28, 29 and 30. It comprises a thread guide member having a thread guiding device and carried by the rod 88 in such manner as to reciprocate therewith and be advanceable in an upward direction thereon as the growing cop operates to displace said member in the reciprocation thereof with the rod 88. It is well known that the intermittent contact between the cop building means and the cop, which is necessary in order to produce the advancement above referred to is likely, by the friction induced, to produce a "burning" of the cop; and where the cop is rotated at an exceedingly high rate of speed, as is so in the case of the present machine, it is obvious that particular attention should be given to this part of the mechanism in order to prevent the "burning" of the cop. To this end, we have provided an impact device, adapted to be impinged by the cop and preferably annular in form, so constructed with reference to the surface portion thereof which impinges against the cop and in its relation to the member (comprising the thread guide) which is to be advanced that the said "burning" of the cop is prevented.

We will now proceed to describe the preferred form of our improved cop building mechanism which Figs. 28 to 30 illustrate. 93 is a thread guide member (carrying a thread guide, as hereinafter explained) and comprising a sleeve 94 which slides freely on the rod 88 and an arm 95 projecting from the sleeve and penetrated by the rod 92. The arm 95 is formed with a ring 96 and in this ring is arranged an annular impact device 97 having an annular exterior flange 98 at its lower end and a milled nut 99 screwed onto its upper end and forming a flange which coacts with the flange 98 to limit the vertical movement of the impact device in the ring 96. The impact device is preferably formed of wood, or some such light substance, and its bore is upwardly tapering, as at 100, being thereby calculated more or less closely to fit the conical upper end of the cop; to enhance the grip which the impact device is designed to acquire upon the tapering end of the cop, the lower end of said bore is preferably rounded or flaring, as at 101. The flanges 98 and 99 are so spaced that they allow slight vertical movement of the impact device in the ring 96; moreover, the impact device is of somewhat less diameter than the interior diameter of the ring, allowing slight lateral movement of the impact device in the ring. Gravity, of course, maintains the impact device in the position shown in Fig. 29, its lower flange being clear of the ring. When, therefore, in the relative reciprocation occurring as between the thread guide member and the cop being wound, the cop impinges against the impact device, the latter is not only free to adjust itself laterally (should the axis of the cop be not exactly coincident with that of ring 96) to the cop, but permits some lost motion to occur before the tendency to produce advancement of the thread guide member begins to become operative. The friction on the cop which would otherwise occur (that is, if the cop directly engaged a part of the thread guide member which was not upwardly displaceable therein and which was subject to the retarding influence of a more or less tightly fitted bearing), is thus very largely absorbed, so that, although the rotating speed of the spindle may be very high, the undesirable "burning" of the cop is not produced. In this connection, it should further be remarked that since the impact device is freely mounted in the ring 96, and since the impacts between the impact device and the cop occur at frequent intervals, the impact device is usually maintained in a state of rotation, whereby the friction between the cop and the impact device is materially less than it would be were the impact device stationary each time the impact occurred. The thread guide 102 is, in the present adaptation, an arm pivoted at one end on a screw 103 and carrying an eyelet 104 at its other end. A projection 105 on the arm rests on a set screw 106 tapped into a projection of the sleeve and is engaged from above by a pin 107 which slides in a projection of the sleeve, a spiral spring 108 interposed between said projection and the head 109 of the pin maintaining the pin against the projection 105. The head of the pin and the end of the screw are preferably rounded, as shown. By adjusting the screw the thread guide proper may be set at any desired elevation to vary the diameter of the cop being wound. To allow the advancement of the thread guide member upwardly step by step, a plate spring 110, bearing at its upper end against the sleeve 94 and having its lower end turned inwardly and engaging the notches in the rod 88, is carried by the lower end of a lever 111 which is pivoted between its ends in the projections 112 of the sleeve 94. Each increment of rise imparted to the thread guide member by the growing cop is maintained by the engagement of the spring 110 with the notched rod 88; and when the building of the cop is completed the lever 111 is pressed upon at its upper end so as to disengage the spring from the rod and allow the thread guide member to be lowered. It will be noted that the spring 110 extends above the pivot of lever 111, so that it normally keeps the lever in the position shown in Fig. 28, the spring being engaged with a notch in rod 88. To determine the point from which the advancement of the member 93 begins, we provide a stop 113 in which is swiveled a screw 114 tapped into a nut or block 115 which slides in a guideway 116 in the stop at right angles to the rod 88 and has the face thereof adjoining the rod serrated, as at 117, to engage the teeth of the rod. When the member 93 is manually released from rod 88 and slid down thereon into engagement with the stop, the lower end of spring 110 is accommodated in a recess 118 in the stop.

Figure 1:
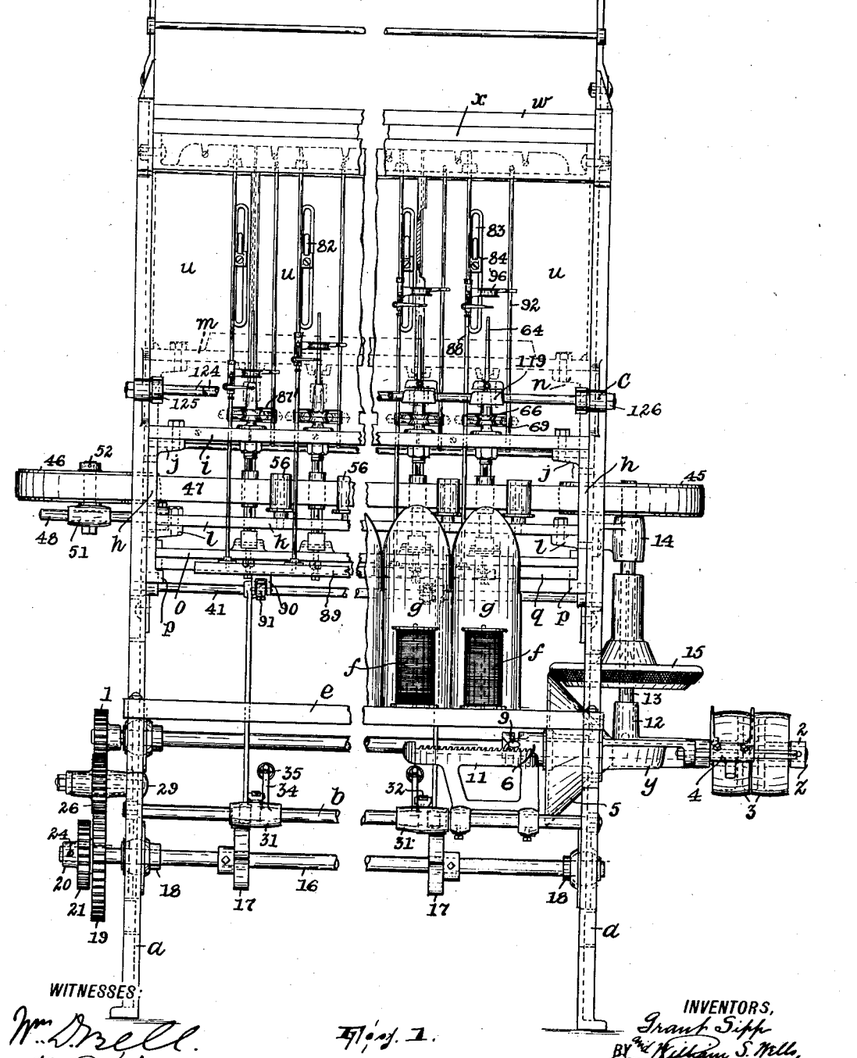
Figure 1 is a view of one side of the machine, a portion thereof being shown in section and other portions removed.
Figure 2:
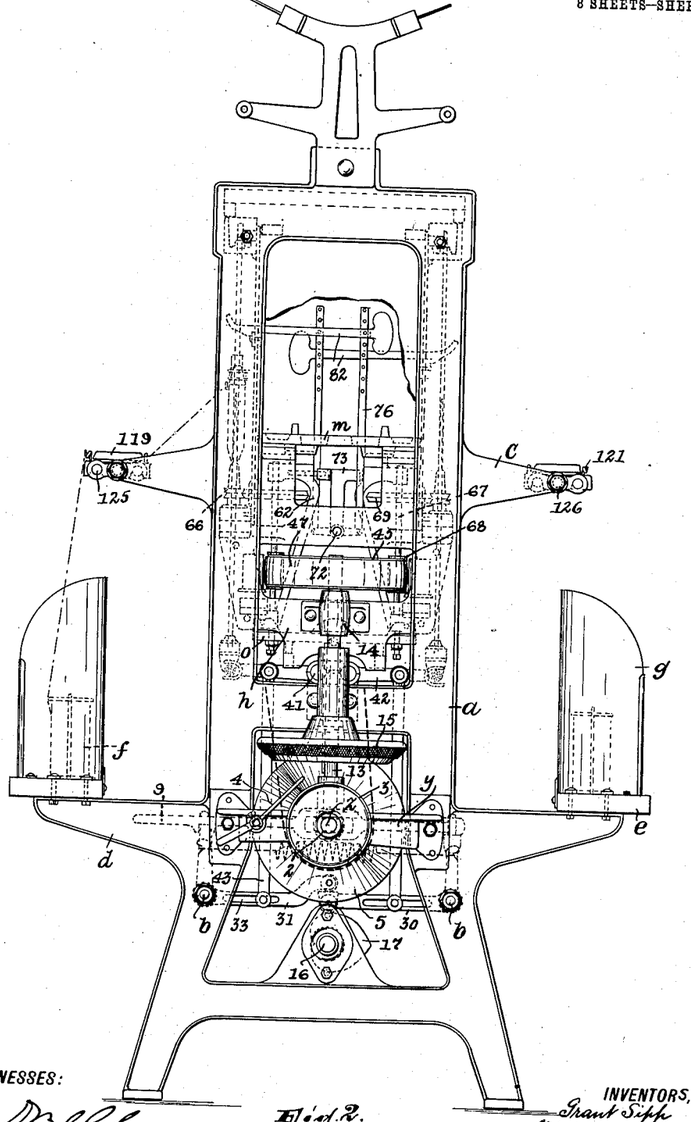
Fig. 2 is an end view, looking from the right in Fig. 1.
Figure 3:
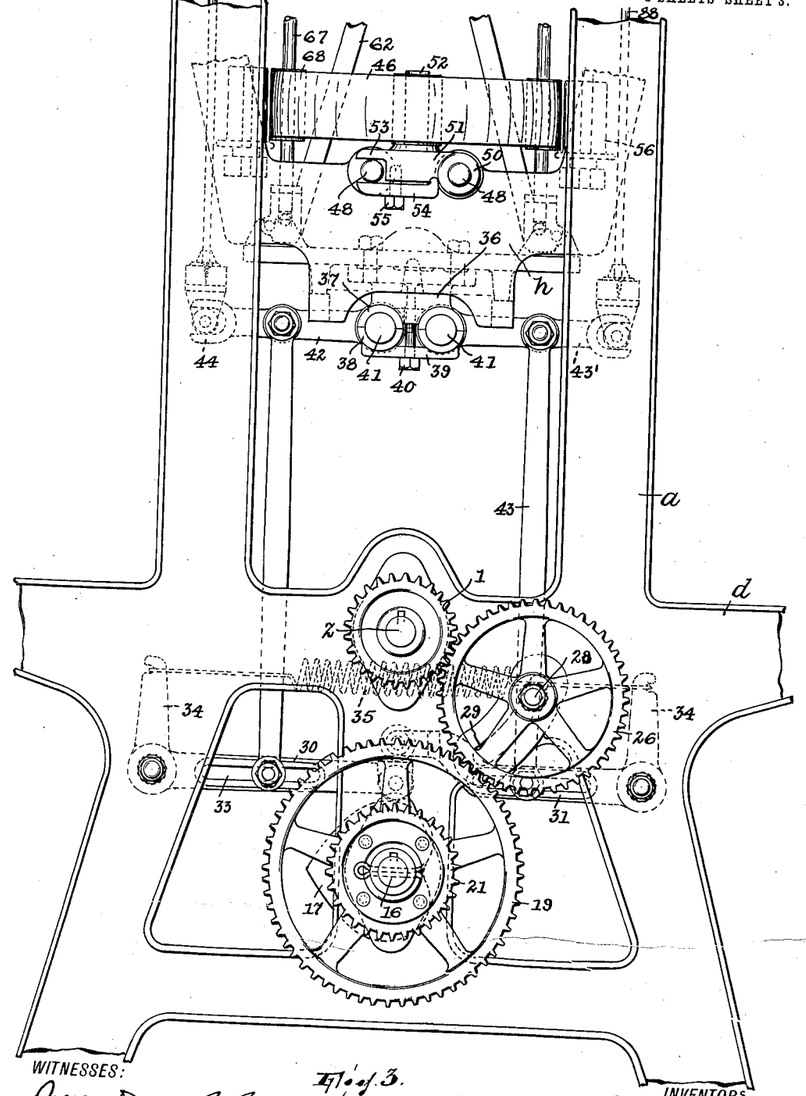
Fig. 3 is an end view, on a larger scale, looking from the left in Fig. 1.
Figure 4:
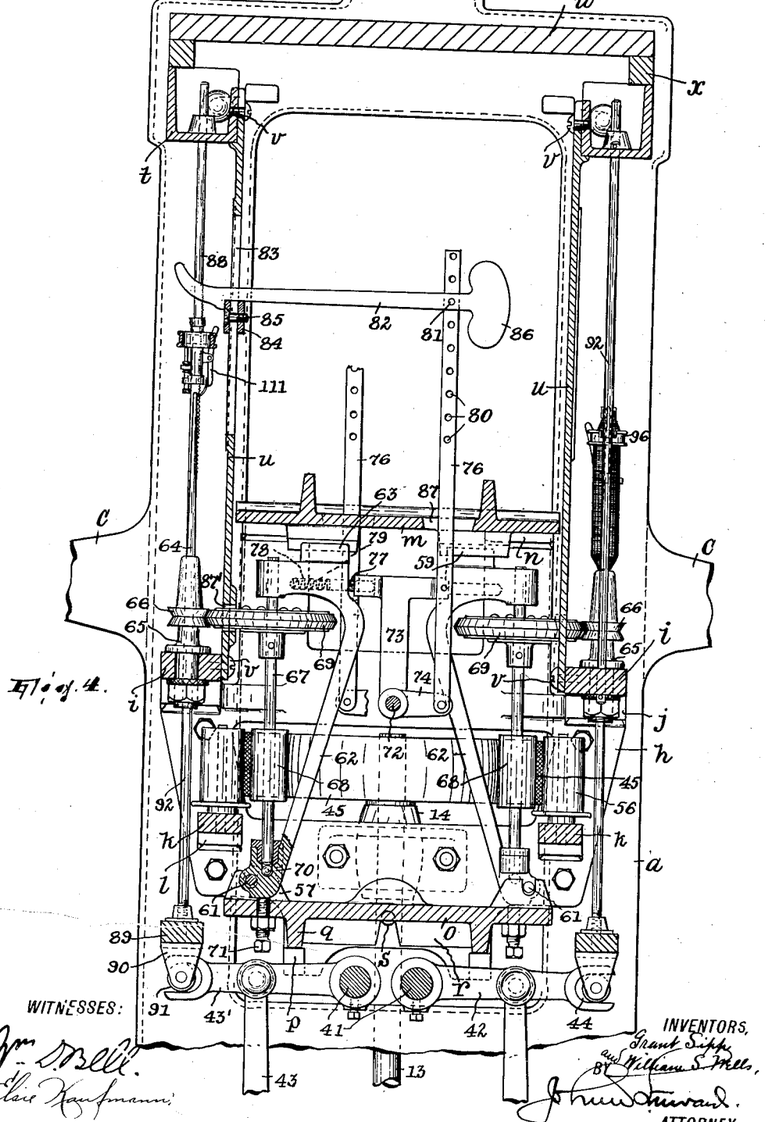
Fig. 4 is a vertical sectional view of the upper part of the machine, looking from left to right in Fig. 1, the section being taken in a vertical plane between two of the winding units.
Figures 5, 7, 9:
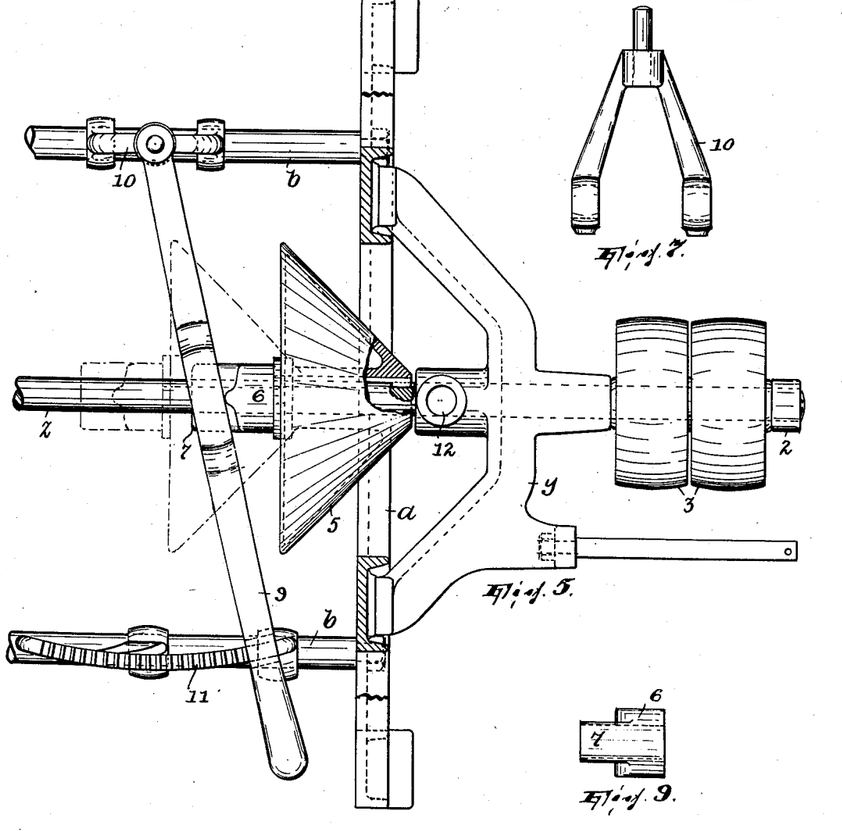
Fig. 5 is a horizontal sectional view of the right-hand end-portion of the machine taken in a plane above the main driving shaft and showing, in plan, a part of the driving mechanism.
Fig. 7 is a detail illustrating the bracket which supports said lever.
Fig. 9 is a detail illustrating the collar.
Figures 6, 8:
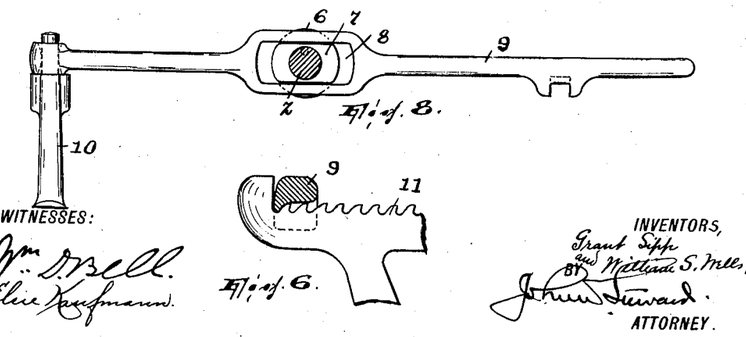
Fig. 6 shows a fragment of a rack for the controlling lever and said lever in section.
Fig. 8 is a side elevation of said lever, its supporting bracket and a collar impinged by said lever and arranged on the main driving shaft, which is shown in section.
Figures 24, 25, 26, 27, 31, 32:
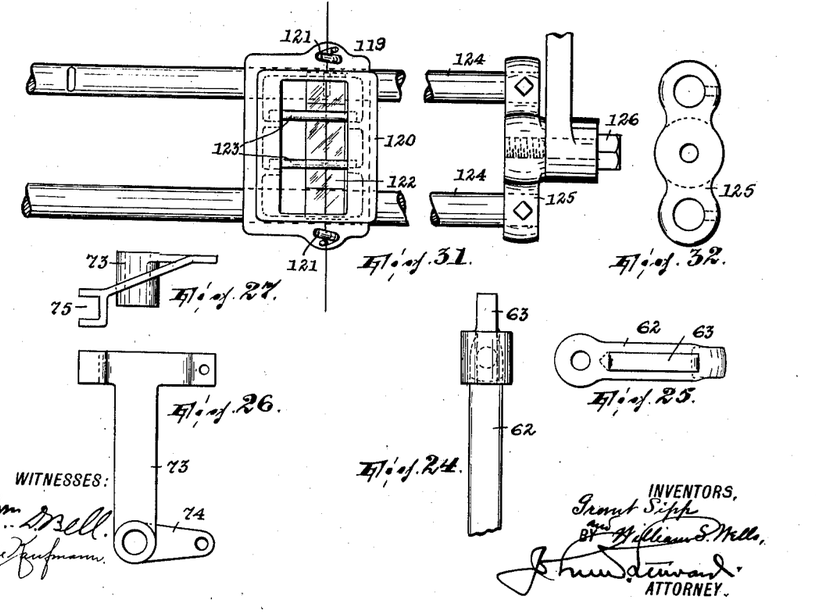

The tension device 119 shown in Figs. 1, 2 and 31 is substantially identical with that shown in the patent to Wells, No. 739523, already referred to, so a specific description thereof and of its mode of operation is not necessary herein further than to say that it comprises a case 120 having thread guides 121 which direct the portion of the thread between them over a plate 122 above which lie two or more rollers 123 freely movable vertically and longitudinally of the thread. As it is desirable, however, so to mount this device that it may be set at any inclination found necessary, a supporting structure therefor is provided which may be tilted. This structure comprises two parallel rods 124 mounted at their ends in brackets 125 into which are tapped at their centers screws 126 passed through the arms $c$ and serving to clamp the supporting structure for the several tension devices at any desired angle.

The operation will be understood by those skilled in the art but may be briefly explained as follows: Shaft $z$, and consequently shaft 13 being rotated, the cams 17 produce oscillations of the rail 89, and hence the reciprocation of the thread guide rods and the cop building mechanisms carried thereby, while the advancing belt rotates the several spindles, to each of which the power is transmitted from the belt through the corresponding rotary transmission members comprising parts 67, 68 and 69, the hook 82 having been engaged with the stop 84 so that the lever structure comprising parts 73, 74 and 76 maintains the carrier for the transmission member in the position where said transmission member engages both the belt and the spindle whirl. The building of the cop starts, of course, with the thread guide member 93 depressed and in engagement with the stop 113 and as it proceeds, in the reciprocation of the thread guide rod 88, the growing cop from time to time produces a relative upward advancement of the member 93. This continues (the thread being meanwhile held under uniform tension by the tension device 119), until the arm 95 of the member 93 engages and raises the hook 82 which latches the lever structure in its normal position. It will thus be disengaged from the stop 84, allowing the lever structure comprising parts 73, 74 and 76 to fall away from the carrier 62 so that the carrier may follow with a corresponding movement, breaking the contact between 66 and 69. When the winding of any particular cop is completed and a fresh one is to be started, the thread guide member 93 is returned into contact with the stop 113 and the hook 82 drawn forward and reëngaged with the stop 84.

It being remarked that the pitch assumed by the coils of thread on the cop depends upon the velocity of the rotary motion relatively to that of the transverse motion involved in the winding operation, in our machine this pitch may readily be varied by changing the relative positions of the members 5 and 15 of the driving mechanism so that member 15 engages member 5 more or less near the greatest diameter of the latter.

Having thus fully described our invention, what we claim and desire to secure by Letters Patent is:

1. In a winding machine or the like, the combination of a support, a rotary driven member journaled therein, a driving member and means, pivoted in its lower portion in said support, for transmitting motion from the driving member to the driven member and comprising a rotary transmission member normally in driving contact with said driven member, the center of gravity of said means being normally laterally offset relatively to a vertical line through the axis of pivotal movement thereof, and a detent mechanism normally holding said means in operative or driving contact with the driven member, substantially as described.

2. In a winding machine or the like, the combination of a support, a rotary driven member journaled therein, a driving member and means, pivoted in its lower portion in said support, for transmitting motion from the driving member to the driven member and comprising a rotary transmission member normally in driving contact with said driven member, the center of gravity of said means being normally laterally offset relatively to a vertical line through the axis of pivotal movement thereof, and a detent mechanism, controlled from the load, normally holding said means in operative or driving contact with the driven member, substantially as described.

3. A thread winding mechanism comprising, in combination, a support, a rotary driven member and a rotary driving member journaled in the support, means for transmitting rotary motion from the driving to the driven member comprising a rotary transmission member movable bodily into, but normally tending to move out of, transmitting engagement with each of the driving and driven members, and a releasable detent means operative to restrain said transmission member against movement, substantially as described.

4. A thread winding mechanism comprising, in combination, a support, a rotary driven member and a rotary driving member journaled in the support, a tilting structure pivotally supported in its lower portion in said support and comprising a rotary transmission member engaging the driving and driven members, said structure normally tending to tilt out of engagement with each of the driving and driven members, and a releasable detent means operative to restrain said structure against tilting movement, substantially as described.

5. In a spindle rotating mechanism, the combination of a support, a rotary driven member and a rotary driving member journaled in the support, a carrier movable toward and from one of said members, a rotary transmission member journaled in the carrier and movable therewith into and out of simultaneous engagement with each of said driving and driven members, and a releasable detent means operative to restrain said structure against movement, substantially as described.

6. In a spindle rotating mechanism, the combination of a support, a rotary driven member and a rotary driving member journaled in the support, a carrier pivoted in the support and movable toward and from one of said members, a rotary transmission member journaled in the carrier and movable therewith into and out of engagement with each of said driving and driven members, and a releasable detent means operative to restrain said structure against movement, substantially as described.

7. A thread winding mechanism comprising, in combination, a support, a rotary driven member and a rotary driving member journaled in the support, a tilting carrier arranged in the support and movable toward and away from one of said members, a rotary transmission member journaled in the carrier and movable therewith into and out of engagement with each of said driving and driven members, and a releasable detent means operative to restrain the transmission member against movement, substantially as described.

8. The combination of a driving belt, a rotary member to be driven forming the axial support for the body of thread to be wound, a carrier movable toward and from the belt and said member, a rotary transmission member journaled in and movable with the carrier and engaging the driven member and the belt and normally holding the belt under tension, a releasable detent means engaging the carrier and normally restraining the same against movement relatively away from the belt, and load controlled means controlling the detent, substantially as described.

9. The combination of a driving belt, a rotary member to be driven forming the axial support for the body of thread to be wound, a carrier pivoted to move in a plane intersecting the belt and movable toward and from the belt and said member, a rotary transmission member journaled in and movable with the carrier and engaging the driven member and the belt and normally holding the belt under tension, a releasable detent means engaging the carrier and normally restraining the same against movement relatively away from the belt, and load controlled means controlling the detent, substantially as described.

10. In a spindle rotating mechanism, the combination of a support, a rotary member journaled in the support, another rotary member movable into and out of engagement with the first member, carrier means for the second rotary member, a pivoted detent means adapted to hold the carrier means in the position where the second member engages the first and including a detent member movable therein into and out of engagement with said support, and a cushion means interposed between the detent means and the carrier means, substantially as described.

11. The combination of a support, a rotary member journaled therein, a tilting structure pivotally supported at its lower end in said support and comprising another rotary member engaging the first member, one of said members having a continuous groove receiving the contact of the other member, and means, engaging said structure at one side of its axis of pivotal movement, for adjusting said structure vertically, substantially as described.

12. The combination, with a suitable support, of a member forming an axial support for the body of thread to be wound, a thread-guide member, means for reciprocating one of said members substantially longitudinally of the axis of the first member and for rotating one of said members around said axis, one of said members being advanceable relatively to the other substantially longitudinally of said axis, and an impact device adapted to impinge the body of thread being wound and carried by the thread-guide member, said device having limited yet appreciable lost motion in the latter substantially longitudinally of said axis, substantially as described.

13. The combination, with a suitable support, of a member forming an axial support for the body of thread to be wound, a thread-guide member, means for reciprocating one of said members substantially longitudinally of the axis of the first member, and for rotating one of said members around said axis, one of said members being advanceable relatively to the other substantially longitudinally of said axis, and an impact device adapted to impinge the body of thread being wound and carried by the thread-guide member, said device having limited yet appreciable lost motion transversely of said axis in the thread-guide member, substantially as described.

14. The combination, with a suitable support, of a member forming an axial support for the body of thread to be wound, a thread-guide member, means for reciprocating one of said members substantially longitudinally of the axis of the first member and for rotating one of said members around said axis, one of said members being advanceable relatively to the other substantially longitudinally of said axis, and an annular impact device adapted to impinge the body of thread being wound and revolubly arranged in the thread-guide member, said device having limited yet appreciable lost motion in the latter substantially longitudinally of said axis, substantially as described.

15. The combination, with a suitable support, of a member forming an axial support for the body of thread to be wound, a thread-guide member, means for reciprocating one of said members substantially longitudinally of the axis of the first member and for rotating one of said members around said axis, one of said members being advanceable relatively to the other substantially longitudinally of said axis, and an annular impact device adapted to impinge the body of thread being wound and revolubly arranged in the thread-guide member, said device having limited yet appreciable lost motion in the latter transversely of said axis, substantially as described.

16. The combination, with a support, of two coactive cop forming members, one of said members affording an axial support for the cop to be formed, means for rotating one of said members around the axis of the cop supporting member and for reciprocating one of said members longitudinally of said axis, one of said members being advanceable relatively to the other longitudinally of said axis, and a cop impact device carried by, and having limited yet appreciable lost motion longitudinally of said axis in, one of said members, substantially as described.

17. The combination, with a support, of two coactive cop-forming members, one of said members affording an axial support for the cop to be formed, means for rotating one of said members around the axis of the cop supporting member and for reciprocating one of said members longitudinally of said axis, one of said members being advanceable relatively to the other longitudinally of said axis, and a cop impact device carried by, and having lost motion laterally of said axis in, one of said members, substantially as described.

18. The combination, with a support, of a winding mechanism comprising a spindle member and a thread-guide member, the latter being engageable with the cop being wound, one of said members being rotative around the axis of the spindle member and one being advanceable by the growing cop relatively to the other, a rotary driving part engaged with and normally movable out of driving engagement with the spindle member, and means, comprising a fulcrumed part projecting into the path of movement of the advanceable member, and a stop adapted to be engaged by said fulcrumed part, for normally maintaining the driving part in engagement with the spindle member, substantially as described.

In testimony that we claim the foregoing, we have hereunto set our hands this 19th day of March, 1910.

GRANT SIPP.
WILLIAM S. WELLS.

Witnesses:
JOHN W. STEWARD,
WM. D. BELL.